Sept. 3, 1929.　　　　G. UHLIG　　　　1,727,260
EGG BREAKING DEVICE
Filed July 18, 1928
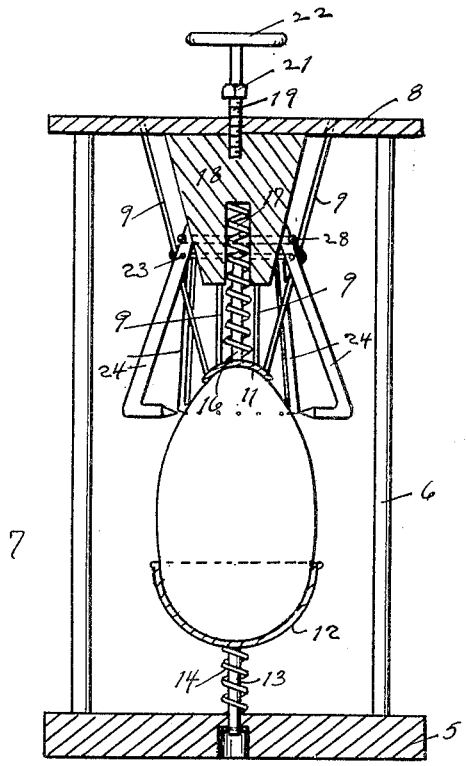
Fig. I.
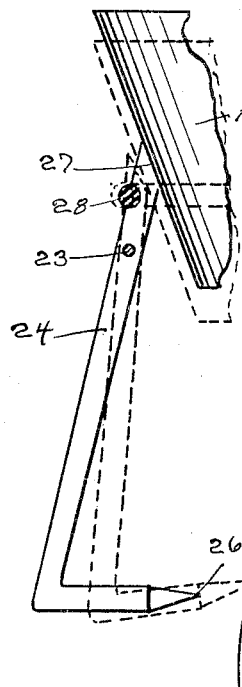
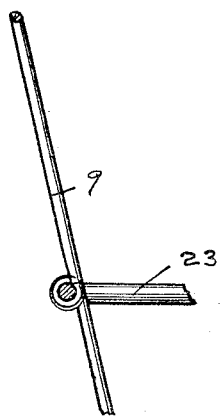
Fig. III.
Fig. II.
INVENTOR.
GEORGE UHLIG
BY Victor J. Evans
ATTORNEYS.

Patented Sept. 3, 1929.

1,727,260

UNITED STATES PATENT OFFICE.

GEORGE UHLIG, OF PORTLAND, OREGON.

EGG-BREAKING DEVICE.

Application filed July 18, 1928. Serial No. 293,711.

This invention relates to improvements in egg breaking devices and has particular reference to means for removing a portion of the egg shell without spilling the contents thereof.

The principal object of this invention is to provide means whereby an egg may be quickly opened without the danger of breaking the whole shell and thus spilling the contents.

A further object is to provide means whereby a shell may be broken without getting bits of the shell into the egg proper.

A still further object is to provide a device which will expedite the serving of eggs as at hotels and like places.

Other objects and advantages will be apparent during the course of the following description.

In the accompanying drawings forming a part of this specification and in which like numerals are employed to designate like parts throughout the same, Figure 1 is a vertical cross section of my device, Figure 2 is a fragmentary detail view showing the manner in which the supporting ring is attached to the tie rods, and Figure 3 is an enlarged fragmentary detail view showing the manner in which the egg picks are actuated.

At the present time it is customary to open eggs by hitting them against a hard object, or by employing a knife and giving a quick blow. This results in the shell being damaged to the extent that bits of shell enter the contents of the egg which is disagreeable to the one eating the same. When great care is used in opening eggs there is considerable delay, which is serious matter in hotels and the like places where customers demand quick service.

Applicant has therefore provided a simple device wherein eggs after being cooked are set in a receptacle and with a slight manipulation the entire end of the egg is perforated with small openings that may be removed from the major portion of the shell.

In the accompanying drawings wherein for the purpose of illustration is shown a preferred embodiment of my invention, the numeral 5 designates a base plate having uprights 6 and 7. These uprights support a top 8 from which downward extending tie rod 9 extend. There are several of these tie rods and they serve to support a concave plate 11 which rests against the small end of the egg. A cup-like member 12 is supported upon a stem 13 which in turn is slidably supported in the base 5 and is surrounded by a spring 14 which normally keeps cup 12 in elevated position.

The concave member 11 carries an upwardly extending stem 16 about which is positioned a spring 17. This spring has its upper end housed in a striker block 18, which striker block is actuated by a stem 19 extending through the top 8 and having a limited nut 21 threadedly positioned thereon. A handle is shown at 22 the purpose of which will be later seen.

The tie rods 9 serve to position a supporting ring 23 at a point adjacent the lower end of the striker block 18. This ring has pivotally positioned thereon a plurality of spaced egg picks 24. These picks have their lower extremities sharpened as shown at 26 and so arranged that they will all move toward each other when the striker block is actuated.

It will be noted that by viewing Figure 3 the upper end of the egg picks are beveled as shown at 27 so as to engage the side of the block 18. A rubber ring 28 surrounds the block 18 and is retained in notches formed in the upper ends of each of the picks.

The result of this construction is that, when it is desired to open an egg, the egg is placed in the cup 12 by slightly depressing the same after which the small end of the egg may be brought under the concave member 11. At this time all of the picks may be held in the full line position of Figures 1 and 2. By now giving a blow upon the handle 22, the block 18 will be caused to move downwardly until the stop 21 engages the top 8. The downward movement of the block 18 will cause the picks to pivot about the supporting ring 23 as illustrated in Figure 3. This will throw all of the points 26 into violent contact with the end of the egg, thus producing simultaneous perforations about the end of the egg. As soon as the block 18 returns to its normal positon, due to the action of the spring 17, the rubber ring will return to the picks in the normal position and the egg can be removed with the perforated end cracked and ready to lift off.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In a device of the character described, a base, a top plate spaced from said base, an egg supporting element carried on said base, a concave member carried by said top plate and adapted to engage the egg positioned in said egg holding member, a plurality of pivoted egg picks supported from said top plate, a movable block supported from said top plate and adapted to move said picks simultaneously for the purpose of causing perforations to be made in the end of the egg.

In testimony whereof I affix my signature.

GEORGE UHLIG.